Sept. 4, 1951  S. M. MARTIN  2,566,846
APPARATUS FOR INSULATING CONDUCTORS
Filed March 30, 1949
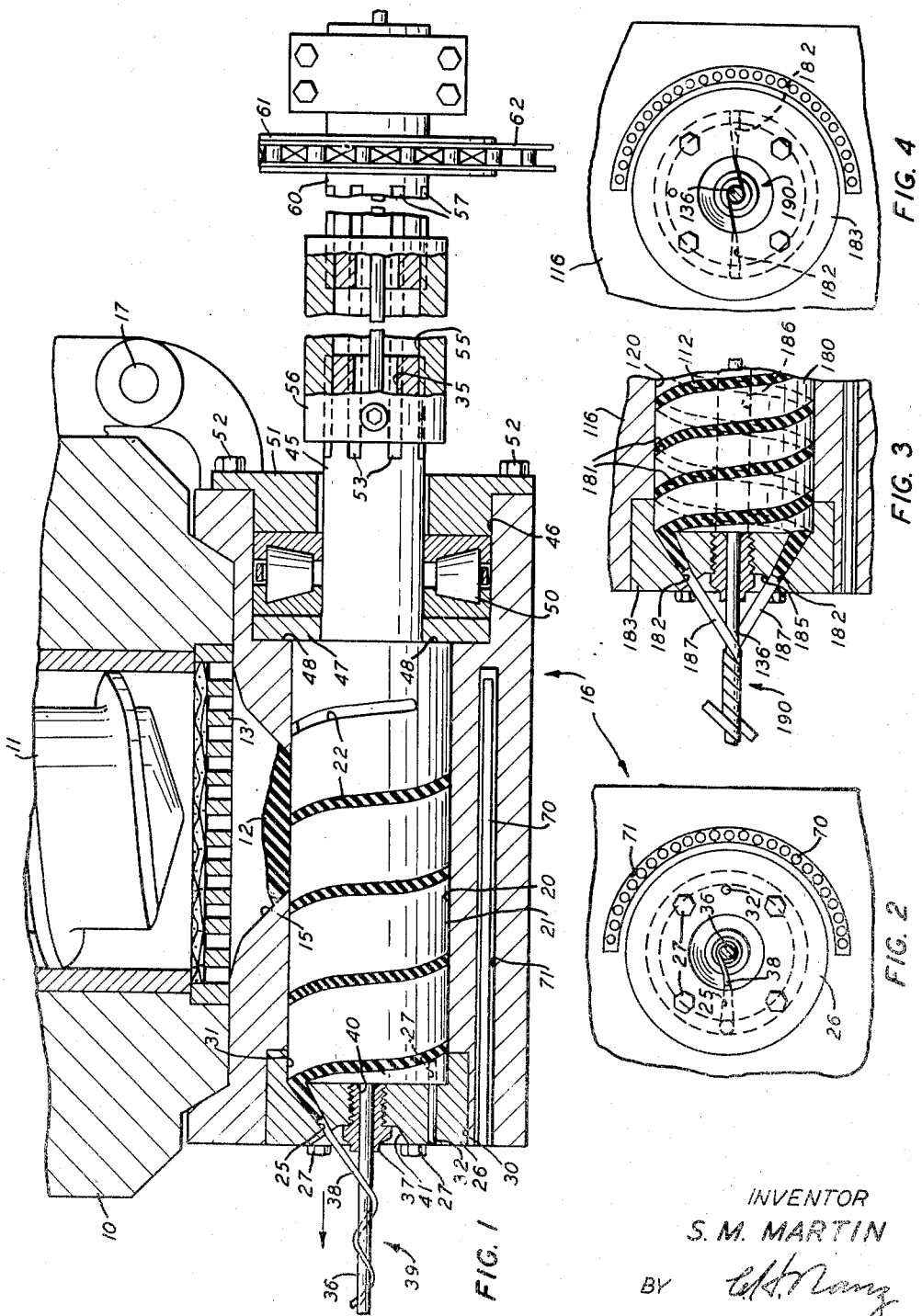
INVENTOR
S. M. MARTIN
BY
ATTORNEY Patented Sept. 4, 1951

2,566,846

UNITED STATES PATENT OFFICE 2,566,846

APPARATUS FOR INSULATING CONDUCTORS

Samuel M. Martin, Baltimore, Md., assignor to Western Electric Company, Incorporated, New York, N. Y., a corporation of New York Application March 30, 1949, Serial No. 84,396

3 Claims. (Cl. 18—13)

This invention relates to apparatus for insulating conductors, and more particularly to apparatus for extruding a strand of insulating material spirally around an advancing core.

Various types of cables used in the transmission of high frequency energy include a central filamentary conductor and an outer tubular conductor insulated therefrom so as to leave a substantial area of the conductors insulated from each other by means of an air space. One type of such cables is generally referred to as video cable, and consists of a plurality of video units twisted together and enclosed in a copper conductor formed by wrapping a copper tape spirally around the composite unit.

One type of video unit includes a central conductor having a thread of polyethylene, or the like, wound spirally around the conductor, and a thin polyethylene tape severed spirally around the thread. In the manufacture of this type of video unit, a plurality of individual manufacturing steps are employed.

An object of the invention is to provide new and improved apparatus for insulating conductors.

Another object of the invention is to provide new and improved apparatus for simultaneously extruding a strand of insulating material and wrapping the extruded strand spirally around a continuously advancing core.

An apparatus illustrating certain features of the invention may comprise an extruding head designed to receive a continuous supply of extrudable material under pressure, a member positioned in the extruding head having a central bore therein through which a core may be advanced and also having an extrusion orifice disposed eccentrically therein with respect to the said bore through which the extrudable material may be forced to form a strand, and means for revolving the member, whereby a strand extruded from the orifice will be wrapped spirally around the core advancing through the head.

A clear understanding of the invention will be had from the following detailed description of a specific embodiment thereof when read in conjunction with the appended drawings, in which:

Fig. 1 is a fragmentary, horizontal, sectional view of an extruding apparatus embodying certain features of the invention;

Fig. 2 is a fragmentary, left end view of the apparatus shown in Fig. 1;

Fig. 3 is a fragmentary, horizontal, sectional view of an apparatus constituting an embodiment of the invention, and Fig. 4 is a fragmentary, left end view of the apparatus shown in Fig. 3.

Referring now to Fig. 1 of the drawing, there is shown a portion of a conventional extruding machine indicated by the numeral 10 in which a stock screw 11 is rotated by suitable driving means (not shown) to force an extrudable compound 12 through a perforated plate 13 so as to maintain a continuous supply of the compound 12 under pressure in a conical opening 15 provided in an extruding head 16. The extruding head 16 is mounted hingedly on the extruding machine 10 at 17, and is arranged to be bolted to the extruding head by suitable bolts (not shown) when the screw 11 is in operation. The extruding head 16 is provided with an elongated bore 20, which passes therethrough at right angles to the screw 11 and communicates with the conical opening 15. A feed screw 21 is mounted rotatably in the bore 20, and is provided with a single spiral groove 22 for conveying the compound 12 from the opening 15 to a conical extrusion orifice 25 provided in a die 26 secured on the end of the screw 11 by means of bolts 27—27.

The die 26 rotates within a counterbore 30 provided in the left end of the extruding head 16. The die 26 is provided with a counterbore 31 to receive the end of the screw 21 and thereby center the die with respect to the central axis of the screw 21. A dowel pin 32 is provided in the die 26 and extends into a bore 27 provided in the end of the screw 21 for aligning the die on the end of the screw so that the discharge end of the groove 22 is aligned directly with the extrusion orifice 25 of the die 26.

The feed screw 21 is provided with a central bore 35 through which a filamentary core 36, such as a conductor, may be advanced continuously from a suitable supply source (not shown) by a suitable takeup means (not shown). A core guide 37 is secured in a central bore provided in the die 26, and is provided with a central bore 40, which is designed to slidably engage the core 36 as it advances through the screw 21. When the screw 21 is rotated in the extruding head, the spiral groove 22 thereon forces the compound 12 under pressure through the extrusion orifice 25 to form a continuous strand 38, and the rotation of the die 26 wraps the strand 38 around the core 36. The extrusion orifice 25 is positioned angularly in the die 26 between the end of the screw 21 and the left-hand face of the die 26 so that it directs the strand 38 being extruded therefrom by rotation of the screw 21 toward the advancing core 36 at the proper angle for wrapping the strand 38 around the core 36 at a predetermined pitch. The exit end of the orifice 25 terminates at a beveled surface 41, which is provided in the left-hand face of the die 26 at right angles to the central axis of the extrusion orifice 25 so that the discharge end of the extrusion orifice 25 is a circle and will then therefore produce a round strand.

The size of the groove 22 is designed to convey a quantity of the compound 12 from the conical opening 15 sufficient to maintain a continuous extrusion of the strand 38 from the orifice 25. The speed of rotation of the die 26 is determined by the desired number of wraps per foot of the strand around the advancing core 36 and the linear speed of the core. The speed of rotation of the main stock screw 11 is adjusted to supply a quantity of the compound 12 continuously to the conical opening 15 corresponding to the quantity taken away by the feed screw 21.

The right-hand end of the screw 21, indicated by the number 45, extends through a counterbore 46 provided in the extruding head 16, and has a diameter substantially less than that of the threaded portion of the screw. A spacer 47 is positioned in the counterbore 46 so that it engages a shoulder 48 formed by the end portion 45 of the screw 21. A thrust bearing 50 is secured in the counterbore 46 against the spacer 47 by a flanged member 51 secured to the end of the head 16 by bolts 52—52.

The end portion 45 of the screw 21 is provided with a plurality of splines 53—53, which engage a splined bore 55 of a sleeve 56. The splined bore 55 also engages splines 57—57 provided on the end of a shaft 60. A sprocket 61 is secured on the shaft 60, and is driven by a chain 62 connected to suitable driving means (not shown). The chain 62 preferably is connected to the driving means arranged to drive the takeup means provided for advancing the core 36 through the extruding head 16 in order to facilitate synchronization between the linear speed of the core and the rotation of the die. By virtue of such synchronized control, the number of spirals of the strand 38 per unit length of the core 36 may be controlled.

The splines 57—57 of the shaft 60 are of such length that the sleeve 56 may be slid completely on the shaft 60 when desired. The shaft 60 is journaled in suitable bearings (not shown) and is spaced a sufficient distance from the end portion 56 of the screw 21 so that when the sleeve is positioned entirely on the shaft 60 the extruding head 16 may be pivoted about the hinge 17 when desired. The heating element 70 may be positioned in a semi-circular groove 71 to heat the portion of the extruding head 16 engaged by the compound 12 in order to maintain the compound in a plastic state so that it may be extruded through the orifice 25.

The central bore 40 of the core guide 37, and the diameter of the extrusion orifice 25 generally bear a definite relation to each other in that the diameter of the strand extruded through the orifice is determined by the gauge of the filamentary core 36. Since the die 26 is readily detachable from the end of the screw 21, the die 26 may be replaced with one having a core guide and an extrusion orifice to suit any particular size of the core.

Operation

Let it be assumed that the stock screw 11 is maintaining a continuous supply of extrudable compound 12 under pressure in the conical opening 15 of the extruding head 16. Let it be further assumed that the core 36 is being advanced from a suitable supply thereof (not shown) through the central bore 35 of the screw 21 and the central bore 40 of the guide 37 at a predetermined linear speed and that the driving means connected to the chain 62 is energized to rotate the shaft 60 and drive the feed screw 21 through the sleeve 56. The groove 22 of the feed screw conveys the compound 12 from the conical opening 15 to the extrusion orifice 25 provided in the die 26, and discharges the compound 12 into the extrusion orifice 25 under pressure sufficient to force the material therethrough in the form of the strand 38.

Since the die 26 and the feed screw 21 are rotating as a unit, the extrusion orifice 25 is revolved around the core 36 advancing through the advancing core 40 of the guide 37, in which case, the extruded strand 38 is wrapped spirally around the advancing core 36. As the strand 38 is extruded from the orifice 25 it may be cooled in any suitable manner before or as the strand is wrapped around the advancing core. The heating element 70 is provided in the semi-circular groove 71 to maintain the portion of the extruding head surrounding the threaded portion of the feed screw 21 at a temperature which will maintain the compound 12 in the plastic state required for its extrusion through the orifice 25.

The extrudable compound 12 may include any of the well-known thermoplastic compounds commonly used for insulating purposes or the like, such as polyvinyl chloride, polystyrene, polyethylene, or the like. If desired, the extrudable compound may be a rubber or rubber-like compound. It may be desirable to pass the composite unit 39 directly through a taping head adapted to wrap a tape spirally around the composite unit 39 before taking it up on a storage reel.

The composite unit 39, including the core 36 and the strand 38 may be taken up on a suitable store reel so that it may be readily handled in further manufacturing operations.

The ratio between the linear speed of the core 36 and the revolutions per minute of the feed screw 21 and the die 26 is regulated to suit the pitch of the spirals of the strand 38 wound on the advancing core 36. For example, let it be assumed that the spirals of the strand 38 of the composite unit 39 are to have one-half inch pitch. Such a pitch requires the die to make twenty-four wraps of the strand 38 per each linear foot of the core 36, in which case, if the core 36 is advanced through the die 26 at the rate of ten linear feet per minute the die and screw must be driven at the 240 R. P. M. When it is desirable to advance the core 36 at such linear speeds as ten feet per minute or above the feed screw 21 and the die 26 may be provided with a number of grooves and extrusion orifices, respectively, which will permit the screw 21 to be driven at a practical speed for such apparatus. For example, if the linear speed of the core 36 is ten feet per minute, the screw 21 may be provided with three grooves, like the groove 22, and the die may be provided with three extrusion orifices, like the orifice 25, directly aligned with the flutes as described for the single groove and extrusion orifice shown in Fig. 1. Under these conditions the screw may be driven 80 R. P. M., in which case, the die extrudes three strands like the strand 38 and wraps them spirally around the core 36 so that the pitch of the adjacent spirals is one-half inch.

It is further noted that the extruding apparatus described hereinabove for simultaneously extruding a fine filamentary strand of insulating material and wrapping the strand spirally around the advancing core may be used readily in conjunction with suitable apparatus adapted to serve or wrap a suitable covering spirally around the composite unit 39 before the unit is coiled up on suitable takeup apparatus.

Alternate embodiment

An alternate embodiment of the invention, as shown in Figs. 3 and 4, is adapted to extrude two filamentary tapes and wrap them spirally around an advancing core. Fig. 3 is a fragmentary, sectional view of a portion of an extruding head 116 which is identical to the extruding head 16 described in the preferred embodiment of the invention. The extruding head 116 is provided with a bore 120 in which a screw 180 is rotatably mounted and arranged to be driven in the manner described for the screw 21. The screw 180 is provided with two grooves 181—181 spaced 180° apart, which are arranged to convey the compound 112 to diametrically opposed extrusion orifices 182—182 provided in a die 183. The die 183 is secured to the left-hand end of the screw 180 and is provided with a dowel pin for aligning the die on the end of the screw in such a position that each of the grooves 181—181 discharge the compound 112 directly into its respective extrusion orifice 182. The extrusion orifices 182—182 are substantially rectangular in cross-section and are tapered toward the left-hand face of the die so that the exit end thereof terminates at a beveled surface 185 provided on the left-hand face of the die as a small rectangular opening. The beveled surface 185 is provided on the face of the die at right angles to the central axis of the extrusion orifices 182—182 so that the exit opening of the orifices is a true rectangle and will therefore extrude a uniform rectangular tape. A filamentary core 136 is adapted to be continuously advanced through a central bore 186 provided in the screw 180 and a central bore 140 provided in a core guide 137 centrally positioned in the die 183. When the screw 180 is rotated in the manner described for the screw 21, the grooves 181—181 convey the compound 112 to their respective extrusion orifice and force the compound therefrom in the form of filamentary tapes 187—187. The orifices 182—182 converge inwardly toward the central axis of the die 173 at an angle corresponding substantially to the pitch of the tapes 187—187 wound spirally around the core 136 when the die is rotated to form the composite unit indicated generally at 190. The filamentary tapes 187—187 may be cooled in any suitable manner as they are extruded from the orifices 182—182 where such treatment is necessary to facilitate the wrapping of the tapes about the core 136 immediately after they are extruded from the die.

Operation of alternate embodiment

Let it be assumed that the compound 112 is being supplied under pressure to the screw 180, that the screw is being rotated, and that the core 136 is being advanced through the extruding head 116 in the manner described for the main embodiment of the invention. The rotating screw 180 conveys the compound 112 to the orifices 182—182 and through the orifices to form tapes 187—187 which are wrapped spirally around the advancing core 136 to form the composite unit 190.

While the above-described apparatus is particularly adapted for extruding a filamentary strand of insulating material around a metallic core to form a video unit, it may be readily adapted for extruding various types of extrudable compounds around textile cores, or the like, without departing from the spirit and scope of the invention.

I claim:

1. An apparatus for extruding a strand around a continuously advancing core, which comprises an extruding head through which a continuously advancing core may be passed and adapted to receive a continuous supply of an extrudable plastic compound, a die rotatably mounted in the extruding head and having a central bore adapted to slidably engage the advancing core which may be advanced and an extrusion orifice eccentrically positioned therein with respect to the said central bore thereof, a material feed screw secured to said die and rotatable in the extruding head for forcing the extrudable compound in the head through the extrusion orifice to form a strand of material, and means for rotating the die and screw so as to wrap the extruded strand spirally around the core advancing through the head, said extrusion orifice being positioned in the die so as to direct the strand toward the advancing core at an angle corresponding to the angle at which the strand is wrapped around the core.

2. An apparatus for extruding a strand of plastic compound around an advancing core, which comprises an extruding head adapted to continuously receive an extrudable plastic compound under pressure and a central bore through which a core may be advanced, a die rotatably mounted adjacent to the exit end of the extruding head and having a central bore adapted to receive the advancing core and an extrusion orifice disposed therein eccentrically with respect to said central bore, a material feed screw rotatably mounted on the extruding head and having a single spiral groove for conveying the material to the extrusion orifice, said die being secured to the discharge end of the screw in such a position that the discharge end of the groove is aligned directly with the extrusion orifice of said die, and means for rotating the feed screw and die secured thereto to extrude the material through the orifice to form a strand and wrap the extruded strand spirally around the core advancing through the central bore of the die, said extrusion orifice being positioned in the die so as to direct the strand toward the advancing core at an angle corresponding substantially to the angle at which the strand is wrapped around the core.

3. An apparatus for extruding a strand of plastic compound around an advancing core, which comprises an extruding head adapted to continuously receive an extrudable plastic compound under pressure, a central bore through which a core may be advanced, a die rotatably mounted adjacent to the exit end of the extruding head and having a central bore adapted to receive the advancing core and a plurality of extrusion orifices disposed therein eccentrically with respect to said central bore, a material feed screw rotatably mounted in the extruding head and having a plurality of spiral grooves for conveying the material to each extrusion orifice, said die being secured to the discharge end of the screw so that each groove is directly aligned with one of the extrusion orifices in said die, and means for rotating the feed screw and die secured thereto to extrude the material through the orifices to form a plurality of strands and wrap the extruded strands around the core advancing through the central bore of the die, said extrusion orifices being positioned in the die so as to direct the extruded strands toward the advancing core at an angle corresponding substantially to the angle at which the strands are wrapped on the core.

SAMUEL M. MARTIN.

REFERENCES CITED

The following references are of record in the file of this patent:

UNITED STATES PATENTS

| Number | Name | Date |
|---|---|---|
| 798,606 | Hawkins | Sept. 5, 1905 |
| 1,637,207 | Whitehouse | July 26, 1927 |
| 2,138,378 | Johnson | Nov. 29, 1938 |
| 2,401,550 | Cook, Jr. | June 4, 1946 |
| 2,465,482 | Rhodes | Mar. 29, 1949 |
| 2,465,656 | Morin | Mar. 29, 1949 |

FOREIGN PATENTS

| Number | Country | Date |
|---|---|---|
| 16,542 | Great Britain | 1911 |
| 614,800 | Great Britain | Dec. 22, 1948 |